United States Patent
Harris et al.

(10) Patent No.: US 9,296,140 B2
(45) Date of Patent: Mar. 29, 2016

(54) ROTARY KNOB ASSEMBLY

(71) Applicant: VISTEON GLOBAL TECHNOLOGIES, INC., Van Buren Twp., MI (US)

(72) Inventors: Daren Lee Harris, Canton, MI (US); Sabin Oana, Howell, MI (US); James Joseph Kornacki, Dearborn, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 112 days.

(21) Appl. No.: 14/173,946

(22) Filed: Feb. 6, 2014

(65) Prior Publication Data

US 2014/0151930 A1    Jun. 5, 2014

Related U.S. Application Data

(62) Division of application No. 13/160,998, filed on Jun. 15, 2011, now Pat. No. 8,686,306.

(51) Int. Cl.

| | |
|---|---|
| *B29C 45/26* | (2006.01) |
| *G05G 1/08* | (2006.01) |
| *H01H 19/11* | (2006.01) |
| *H01H 19/14* | (2006.01) |
| *B60K 37/06* | (2006.01) |
| *G05G 5/03* | (2008.04) |

(52) U.S. Cl.
CPC .............. *B29C 45/2673* (2013.01); *B60K 37/06* (2013.01); *G05G 1/08* (2013.01); *H01H 19/11* (2013.01); *H01H 19/14* (2013.01); *B60K 2350/102* (2013.01); *G05G 5/03* (2013.01)

(58) Field of Classification Search
CPC ............................. B29C 45/2673; G05G 5/03
See application file for complete search history.

(56) References Cited

U.S. PATENT DOCUMENTS

| | | | | |
|---|---|---|---|---|
| 2,733,479 | A | * | 2/1956 | English ........................... 249/68 |
| 4,684,101 | A | * | 8/1987 | Wagner et al. ................. 249/144 |
| 4,792,297 | A | * | 12/1988 | Wilson ..................... 425/192 R |
| 5,134,898 | A | | 8/1992 | Anderson |
| 5,310,974 | A | | 5/1994 | Churchill et al. |
| 5,369,230 | A | | 11/1994 | Misawa |
| 6,067,424 | A | | 5/2000 | Shono |
| 7,223,926 | B1 | | 5/2007 | Gannon et al. |
| 7,423,230 | B2 | | 9/2008 | Yoritsune et al. |
| 7,439,458 | B2 | | 10/2008 | Montalvo |
| 7,732,724 | B2 | | 6/2010 | Otani et al. |
| 2005/0113013 | A1 | * | 5/2005 | Hentschel ....................... 454/69 |
| 2011/0061489 | A1 | * | 3/2011 | Bulin et al. .................... 74/553 |

* cited by examiner

*Primary Examiner* — Jill Heitbrink
(74) *Attorney, Agent, or Firm* — Fraser Clemens Martin & Miller LLC; James D. Miller

(57) ABSTRACT

A rotary knob assembly and methods for forming and controlling friction effecting features of the knob assembly are disclosed. The knob assembly includes a mounting structure and a knob. The knob is rotatably coupled to a bezel of the mounting structure. The knob includes a stabilizer, a guide member, and a retainer having a patterned surface. At least a portion of the stabilizer is disposed between the bezel and the retainer to maintain an axial position and a radial position of the knob. A detent formed on the guide member cooperates with a patterned surface of the retainer to provide a haptic feedback to a user.

17 Claims, 6 Drawing Sheets

ROTARY KNOB ASSEMBLY

CROSS-REFERENCE TO RELATED APPLICATIONS

This application is a divisional application of U.S. patent application Ser. No. 13/160,998 filed Jun. 15, 2011, hereby incorporated herein by reference in its entirety.

FIELD OF THE INVENTION

The invention relates to a rotary knob assembly, and more particularly to a rotary knob assembly for an instrument panel, and a method by which the rotary knob assembly is formed and tuned.

BACKGROUND OF THE INVENTION

Presently known automotive vehicle instrument panels have rotary control knobs to effect an operation of electrical equipment associated with the vehicle. These rotary control knobs may be manually moved to effect an operation of vehicle lights, radio volume, heater, or air conditioner, for example. One configuration of the rotary control knob an encoder or potentiometer with haptics incorporated therein.

Typically, interfaces between the knob and the bezel of the rotary knob have close tolerances. Despite the close tolerances, the rotary knobs may have a loose or wobbly feel to a user and an undesired noise can be produced due to a rattle between the knob and the bezel. Because of a size of the bezel, a molding process thereof results in a wide variation of bezels produced. In particular, a current mold assembly of the molding process has difficulty producing repeatable concentric guide posts on the bezel. To tune current rotary knobs, a concentricity of the guide post of the bezel is tuned. However, a tuning of the current mold assembly of the bezel is difficult.

Accordingly, it would be desirable to produce a knob assembly and methods for forming and tuning thereof, wherein a wobble of the knob assembly is minimized and a tuning of a mold assembly for the knob assembly is easily tuned.

SUMMARY OF THE INVENTION

In concordance and agreement with the present invention, a knob assembly and methods for forming and tuning thereof, wherein a wobble of the knob assembly is minimized and a tuning of a mold assembly for the knob assembly is easily tuned, has surprisingly been discovered.

In one embodiment, the knob assembly comprises: a mounting structure including a bezel; and a knob rotatably coupled to the mounting structure, the knob including a stabilizer and a retainer having a patterned surface, wherein at least a portion of the stabilizer is disposed between the bezel and the retainer to maintain an axial position and a radial position of the knob.

The invention also provides a method for forming a knob assembly comprises the steps of: (a) providing a cavity insert for a mold assembly; (b) providing an inner core insert for the mold assembly; (c) providing an outer core insert for the mold assembly; (d) positioning the cavity insert, the inner core insert, and the outer core insert to form a mold cavity within the mold assembly for receiving a molten material therein; and (e) introducing the molten material into the mold cavity, wherein at least one of the cavity insert, the inner core insert, and the outer core insert is at least one of modifiable and replaceable, and wherein the cavity insert, the inner core insert, and the outer core insert form friction affecting features of the knob assembly.

The invention also provides a method for tuning a knob assembly comprising the steps of: (a) providing a plurality of inserts to form a mold cavity for a mold assembly, wherein at least one of the inserts is at least one of modifiable and replaceable; (b) electing at least one of the inserts to be at least one of modified and replaced; and (c) at least one of modifying and replacing the at least one of the inserts to control friction affecting features of the knob assembly.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENTS

The following detailed description and appended drawings describe and illustrate various exemplary embodiments of the invention. The description and drawings serve to enable one skilled in the art to make and use the invention, and are not intended to limit the scope of the invention in any manner.

Figure 1:
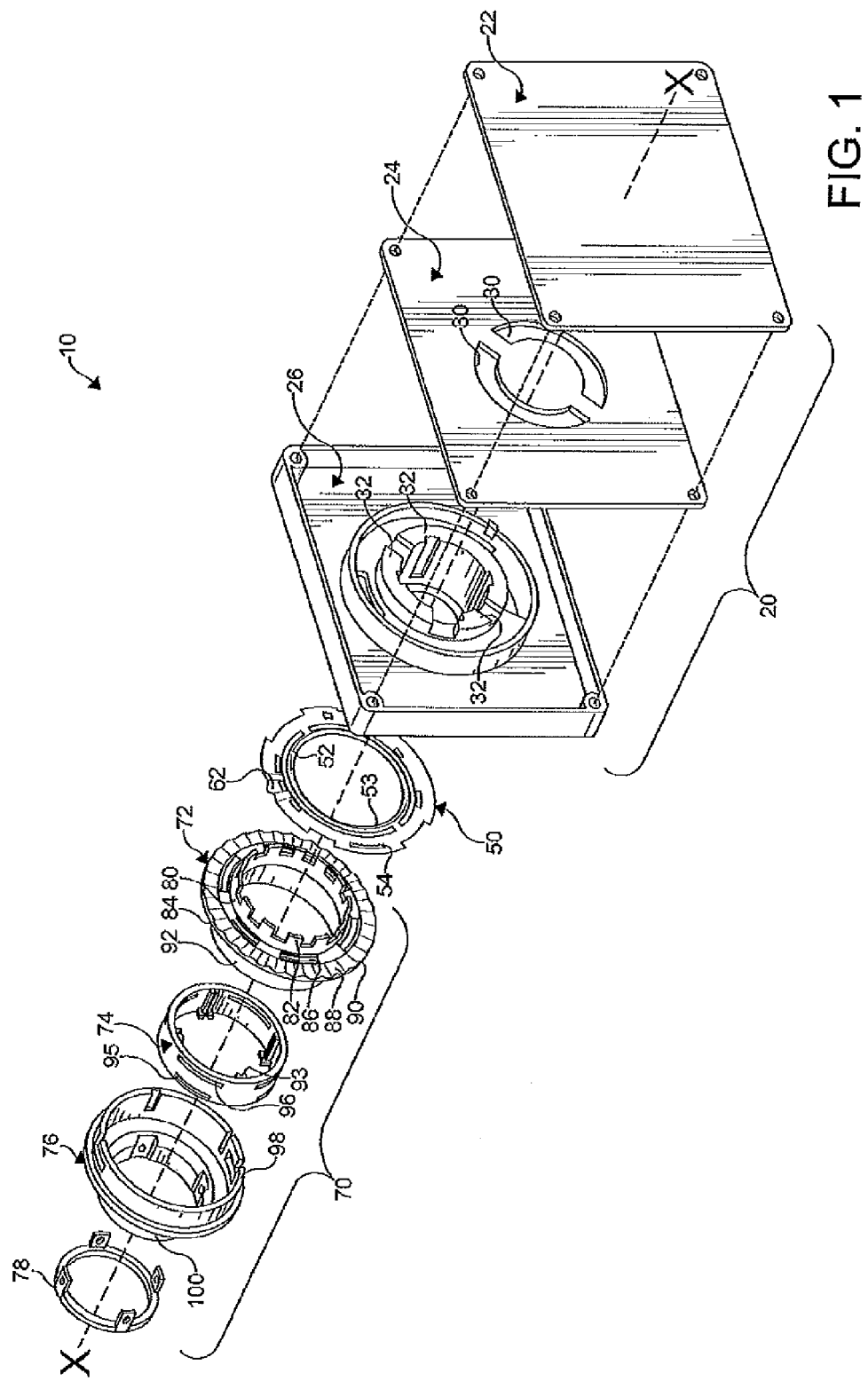
FIG. 1 is an exploded rear perspective view of a rotary knob assembly according to an embodiment of the invention.
Figure 2:
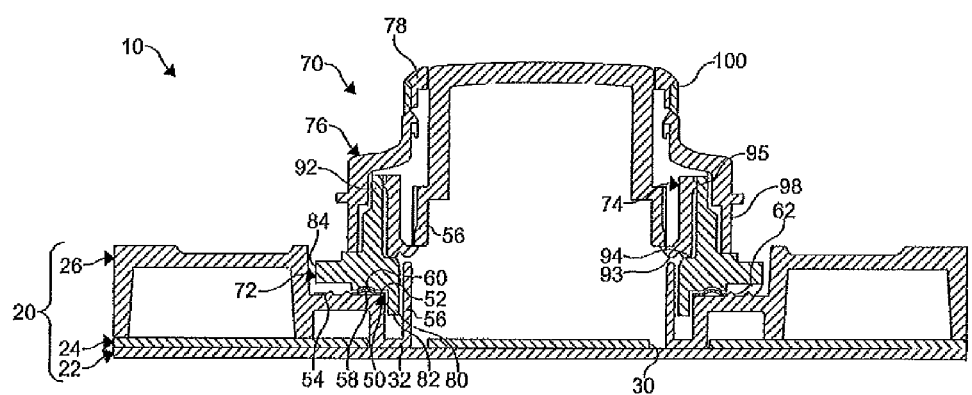
FIG. 2 is a cross-sectional view of the assembled rotary knob assembly illustrated in FIG. 1.

FIGS. 1-2 show a rotary knob assembly 10 according to an embodiment of the invention. Although the knob assembly 10 shown and described as being used with a vehicle instrument panel, it should be understood that the knob assembly 10 can be used as an input device for any type of component such as hand-held devices or non-vehicular electrical equipment, for example. The knob assembly 10 includes a mounting structure 20, a guide member 50, and a knob 70. As shown, a single knob 70 is received on the mounting structure 20. However, the mounting structure 20 can be formed to receive as many knobs 70 as desired.

The mounting structure 20 shown includes a contact board 22, an elastomeric switch mat 24, and a bezel 26. The contact board 22 may be a printed wiring board (PWB) or a printed circuit board (PCB), or any suitable device that permits engagement and disengagement of an electrical connection. The contact board 22 shown is a rigid substrate having conductive traces (not shown) formed thereon or therein. It is understood that the contact board 22 could be semi-rigid or flexible if desired. The conductive traces can be formed on the contact board 22 using a variety of process known in the art such as wire soldered to appropriate connections, copper traces printed on mylar, or conductive ink applied to a hybrid ceramic, for example. The switch mat 24 is typically formed of molded silicone rubber. However, it is understood that the switch mat 24 can be formed from any suitable material as desired. As illustrated, a plurality of spaced-apart arcuate-shaped openings 30 is formed in the switch mat 24 to receive corresponding portions 32 of the bezel 26 therethrough. The bezel 26 can be affixed to an electronic instrument panel (not shown) or can be integrally formed as part of the electronic instrument panel, if desired. The contact board 22, the switch mat 24, and the bezel 26 can be secured together by any means as desired such as by fasteners, an adhesive, an interference fit, and the like, for example.

The mounting structure 20 further includes the guide member 50 disposed thereon. The guide member 50 is fixedly coupled to the bezel 26 so as to remain in position during a rotation of the knob 70. The guide member 50 can be secured to the mounting structure 20 by any means as desired such as by a heat staking process, snap or interference fit, fasteners, clips, adhesive, and the like, for example. The guide member 50 shown has a generally circular shape and includes an inner ring 52 having a central aperture 53 coupled to an outer ring 54. The central aperture 53 permits the guide member 50 to be disposed on the bezel 26 surrounding a guide post 56 thereof. The inner ring 52 further includes an annular groove 58 formed therein. The groove 58 forms an annular raised portion 60 extending towards the knob 70. The outer ring 54 of the guide member 50 includes at least one detent 62 formed thereon. The guide member 50 shown is produced from any suitable material such as steel, for example. The guide member 50 may also include a lubricant (e.g. grease) applied thereto to minimize surface friction.

The knob 70 is coupled to the mounting structure 20 for rotational movement on the mounting structure 20 about a central axis X. As illustrated in FIG. 1, the knob 70 includes a retainer 72, a stabilizer 74, an outer housing 76, and an aesthetic feature 78 such as a chrome-plated accent piece, for example. Additional or fewer aesthetic features 78 than shown can be disposed on or integrated into the knob 70 as desired. As shown in FIG. 2, the retainer 72 is rotatably disposed between the guide member 50 and the stabilizer 74. A first end 80 of the retainer 72 is crenellated having a series of spaced-apart teeth 82. The teeth 82 can have any shape and size as desired such as square, rectangular, triangular, semi-circular, and the like, for example.

A radially outwardly extending skirt 84 is formed on the retainer 72 adjacent the crenellated first end 80. The skirt 84 includes an inner portion having an annular array of grooved landings 86 which receive and cooperate with the raised portion 60 of the guide member 50 to maintain a radial position of the retainer 72, and therefore the knob 80. An outer portion of the skirt 84 includes a patterned surface. It is understood that the term "patterned surface" used herein refers to a surface including any shapes and configurations thereof, as well as a substantially planar surface. As shown in FIG. 1, the patterned surface is defined by a plurality of sinusoidal peaks 88 and troughs 90. The peaks 88 and troughs 90 slidingly contact the stationary detent 62 of the guide member 50 during the rotation of the knob 70 to produce and transmit a desired haptic feedback to a user. The retainer 72 can be formed from any suitable material such as a polycarbonate (PC) material, an acrylonitrile butadiene styrene (ABS) material, a polyoxymethylene (POM) material, a thermoplastic polyester elastomer material, a combination thereof, and the like, for example.

As illustrated in FIG. 2, the stabilizer 74 is disposed between a guide post 54 of the bezel 26 and a second end 92 of the retainer. The stabilizer 74 shown is fixedly coupled to the bezel 26 so as to remain in position during the rotation of the knob 70. It is understood that the stabilizer 74 can be coupled to the bezel 26 by any means as desired such as by retention feet 93, an interference fit, fasteners, adhesive, and the like, for example. A bottom surface of the stabilizer 74 abuts a ledge 94 formed in the retainer 72 to urge the retainer 72 onto the guide member 50 and to maintain an axial position of the retainer 72, and therefore the knob 70. The stabilizer 74 may include an array of protuberances (not shown) formed on the lower surface to minimize friction between the stabilizer 74 and the retainer 72 during the rotation of the knob 70. The stabilizer 74 is substantially ring shaped and includes an annular array of tabs 95 formed on an outer surface thereof. The tabs 95 abut an inner surface of the retainer 72 to further maintain a radial position of the retainer 72, and therefore the knob 70. The tabs 95 further minimize friction between the stabilizer 74 and the retainer 72. It is understood that the stabilizer 74 can be formed without the tabs 95 if desired. Because the stabilizer 74 maintains the axial and radial positions of the retainer 72, an undesired wobble of the knob 70 is minimized.

As shown in FIG. 1, a plurality of rectangular shaped openings 96 is formed in the stabilizer 74. The openings 96 permit a flexing of the stabilizer 74, and thereby control an axial load on the retainer 72. Thus, an amount of torque needed to rotate the knob 70 is dependent on a size and shape of the openings 96. For example, smaller openings 96 permit less flexing of the stabilizer 74, and thereby increase the axial load on the retainer 72. Therefore, the amount of torque needed to rotate the knob 70 is also increased. Conversely, larger openings 96 permit more flexing of the stabilizer 74, and thereby decrease the axial load on the retainer 72. Therefore, the amount of torque needed to rotate the knob 70 is also decreased. It is understood that each of the openings 96 can have any size and shape as desired to obtain a desired torque requirement for the knob 70. It is further understood that the stabilizer 74 can be formed from any suitable material such as a polycarbonate (PC) material, an acrylonitrile butadiene styrene (ABS) material, a polyoxymethylene (POM) material, a thermoplastic polyester elastomer material, a combination thereof, and the like, for example.

The outer housing 76 is generally cylindrical and includes a first end 98 and a second end 100. As shown in FIG. 2, the first end 98 of the outer housing 76 circumscribes the retainer 72 and is coupled thereto. It is understood that the outer housing 76 can be coupled to the retainer 72 by any means as desired such as fasteners, clips, a snap or interference fit, adhesive, and the like, for example. The second end 100 of the outer housing 76 receives the aesthetic feature 78 thereon. The aesthetic feature 78 and the second end 100 of the outer housing 76 circumscribe the guide post 54 of the bezel 26 forming an interstitial space therebetween to permit rotational movement of the knob 70. The outer housing 76 can be formed from any suitable material such as a polycarbonate (PC) material, an acrylonitrile butadiene styrene (ABS) material, a combination thereof, and the like, for example.

The knob assembly 10 further includes a sensor assembly (not shown) including at least one sensor (not shown) for detecting a rotation position of the knob 70 relative to the mounting structure 20 by detecting a presence of the teeth 82 formed on the retainer 72. The sensor is in electrical communication with the contact board 22. For example, the sensor can be the conductive traces formed on the contact board 22 or separate components individually mounted on the contact board 22. The contact board 22 transmits a signal from the sensor directly to a device or system associated with the knob assembly 10 (not shown), or to a controller (not shown) for controlling an operation of device or system.

In operation, the user rotates the knob 70 to provide input for controlling the device or system associated with the knob assembly 10. For example, the device or system could be a climate control system, an audio and video system, a navigation system, and the like, for example. The knob 70 may be manually rotated by the user, or alternatively, rotated with assistance of an electrical motor based on input from the user entered into a controller. As the knob 70 is rotated about the axis X, the teeth 82 of the retainer 72 travel along a circular path, passing through a sight line of the sensor of the sensor assembly. The sensor detects a change in position of the knob 70 relative to the mounting structure 20. This detection by the sensor causes the control board 22 to generate and transmit a signal to the device or system, or to the controller which controls the operation of the device or system.

When the knob 70 is manually rotated, the outer portion of the skirt 84 of the retainer 72 slidingly travels along the outer ring 54 of the guide member 50. The detent 62 formed in the outer ring 54 contacts the patterned surface of the outer portion of the skirt 84 to produce the desired feedback, which is transmitted to the user. Typically, the desired feedback is associated with particular setting of the device or system.

Figure 3:
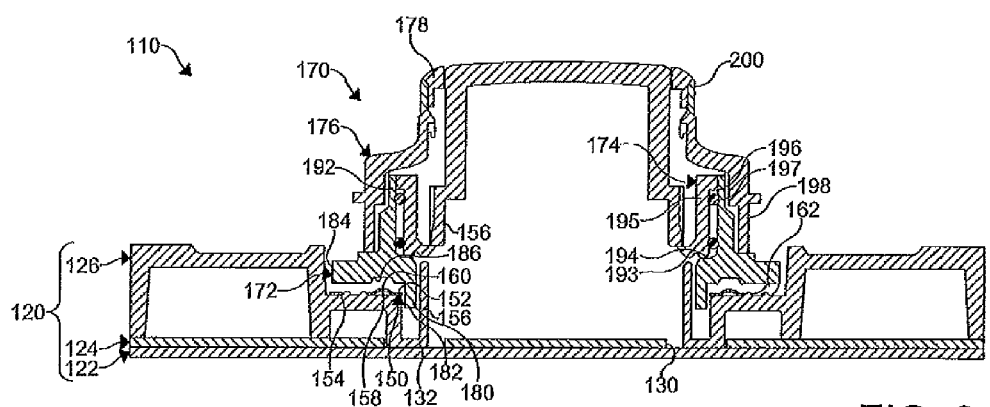
FIG. 3 is a cross-sectional view of a rotary knob assembly according to another embodiment of the invention.

FIG. 3 shows a rotary knob assembly 110 according to another embodiment of the invention. Although the knob assembly 110 shown and described as being used with a vehicle instrument panel, it should be understood that the knob assembly 110 can be used as an input device for any type of component such as hand-held devices or non-vehicular electrical equipment, for example. The knob assembly 110 includes a mounting structure 120, a guide member 150, and a knob 170. As shown, a single knob 170 is received on the mounting structure 120. However, the mounting structure 120 can be formed to receive as many knobs 170 as desired.

The mounting structure 120 shown includes a contact board 122, an elastomeric switch mat 124, and a bezel 126. The contact board 122 may be a printed wiring board (PWB) or a printed circuit board (PCB), or any suitable device that permits engagement and disengagement of an electrical connection. The contact board 122 shown is a rigid substrate having conductive traces (not shown) formed thereon or therein. It is understood that the contact board 122 could be semi-rigid or flexible if desired. The conductive traces can be formed on the contact board 122 using a variety of process known in the art such as wire soldered to appropriate connections, copper traces printed on mylar, or conductive ink applied to a hybrid ceramic, for example. The switch mat 124 is typically formed of molded silicone rubber. However, it is understood that the switch mat 124 can be formed from any suitable material as desired. As illustrated, a plurality of spaced-apart arcuate-shaped openings 130 is formed in the switch mat 124 to receive corresponding portions 132 of the bezel 126 therethrough. The bezel 126 can be affixed to an electronic instrument panel (not shown) or can be integrally formed as part of the electronic instrument panel, if desired. The contact board 122, the switch mat 124, and the bezel 126 can be secured together by any means as desired such as by fasteners, an adhesive, an interference fit, and the like, for example.

The mounting structure 120 further includes the guide member 150 disposed thereon. The guide member 150 is fixedly coupled to the bezel 126 so as to remain in position during a rotation of the knob 170. The guide member 150 can be secured to the mounting structure 120 by any means as desired such as by a heat staking process, snap or interference fit, fasteners, clips, adhesive, and the like, for example. The guide member 150 shown has a generally circular shape and includes an inner ring 152 having a central aperture 153 coupled to an outer ring 154. The central aperture 153 permits the guide member 50 to be disposed on the bezel 26 surrounding a guide post 156 thereof. The inner ring 152 shown further includes an annular groove 158 formed therein. It is understood, however, that the inner ring 152 can be substantially planar if desired. The groove 158 forms an annular raised portion 160 extending towards the knob 170. The outer ring 154 of the guide member 150 includes at least one detent 162 formed thereon. The guide member 150 shown is produced from any suitable material such as steel, for example. The guide member 150 may also include a lubricant (e.g. grease) applied thereto to minimize surface friction.

The knob 170 is coupled to the mounting structure 120 for rotational movement on the mounting structure 120 about a central axis X. The knob 170 includes a retainer 172, a stabilizer 174, an outer housing 176, and an aesthetic feature 178 such as a chrome-plated accent piece, for example. Additional or fewer aesthetic features 178 than shown can be disposed on or integrated into the knob 170 as desired. As shown, the retainer 172 is rotatably disposed between the guide member 150 and the stabilizer 174. A first end 180 of the retainer 172 is crenellated having a series of spaced-apart teeth 182. The teeth 182 can have any shape and size as desired such as square, rectangular, triangular, semicircular, and the like, for example.

A radially outwardly extending skirt 184 is formed on the retainer 172 adjacent the crenellated first end 180. The skirt 184 includes an inner portion having an annular groove 186 formed therein to militate against contact with the inner ring 152 of the guide member 150. An outer portion of the skirt 184 includes a patterned surface. The patterned surface slidingly contacts the stationary detent 162 of the guide member 150 during the rotation of the knob 170 to produce and transmit a desired haptic feedback to a user. The retainer 172 can be formed from any suitable material such as a polycarbonate (PC) material, an acrylonitrile butadiene styrene (ABS) material, a polyoxymethylene (POM) material, a thermoplastic polyester elastomer material, a combination thereof, and the like, for example.

As illustrated, the stabilizer 174 is disposed between a guide post 154 of the bezel 126 and a second end 192 of the retainer. The stabilizer 174 shown is fixedly coupled to the bezel 126 so as to remain in position during the rotation of the knob 170. It is understood that the stabilizer 174 can be coupled to the bezel 126 by any means as desired such as by retention feet 193, an interference fit, fasteners, adhesive, and the like, for example. The stabilizer 174 abuts a ledge 194 formed in the retainer 172 to urge the retainer 172 onto the guide member 150 and to maintain an axial position of the retainer 172, and therefore the knob 170.

The stabilizer 174 is a bearing assembly including an inner track 195, an outer track 196, and a plurality of ball bearings 197 disposed therebetween. The outer track 196 of the bearing assembly shown is the second end 192 of the retainer 172. However, it is understood that the outer track 196 can be a separate, individual component disposed between the bearings 197 and the retainer 172, if desired. The stabilizer 174 abuts an inner surface of the retainer 172 to further maintain a radial position of the retainer 172, and therefore the knob 170. Because the stabilizer 174 maintains the axial and radial positions of the retainer 172, an undesired wobble of the knob 170 is minimized. It is understood that the tracks 195, 196 and the bearings 197 of the stabilizer 174 can be formed from any suitable material such as a plastic material or a metal material (e.g. steel), for example. The stabilizer 174 may also include a lubricant (e.g. grease) applied thereto to minimize friction within the bearing assembly, as well as between the stabilizer 174 and the retainer 172.

The outer housing 176 is generally cylindrical and includes a first end 198 and a second end 200. The first end 198 of the outer housing 176 circumscribes the retainer 172 and is coupled thereto. It is understood that the outer housing 176 can be coupled to the retainer 172 by any means as desired such as fasteners, clips, a snap or interference fit, adhesive, and the like, for example. The second end 200 of the outer housing 176 receives the aesthetic feature 178 thereon. The aesthetic feature 178 and the second end 200 of the outer housing 176 circumscribe the guide post 154 of the bezel 126 forming an interstitial space therebetween to permit rotational movement of the knob 170. The outer housing 176 can be formed from any suitable material such as a polycarbonate (PC) material, an acrylonitrile butadiene styrene (ABS) material, a combination thereof, and the like, for example.

The knob assembly 110 further includes a sensor assembly (not shown) including at least one sensor (not shown) for detecting a rotation position of the knob 170 relative to the mounting structure 120 by detecting a presence of the teeth 182 formed on the retainer 172. The sensor is in electrical communication with the contact board 122. For example, the sensor can be the conductive traces formed on the contact board 122 or separate components individually mounted on the contact board 122. The contact board 122 transmits a signal from the sensor to a controller (not shown) for controlling an operation of a device or system associated with the knob assembly 110.

Since operation of the knob assembly 110 shown in FIG. 3 is substantially similar to the operation of the knob assembly 10 shown in FIGS. 1-2, for simplicity, the operation of the knob assembly 110 will be as described hereinabove.

Figure 4:
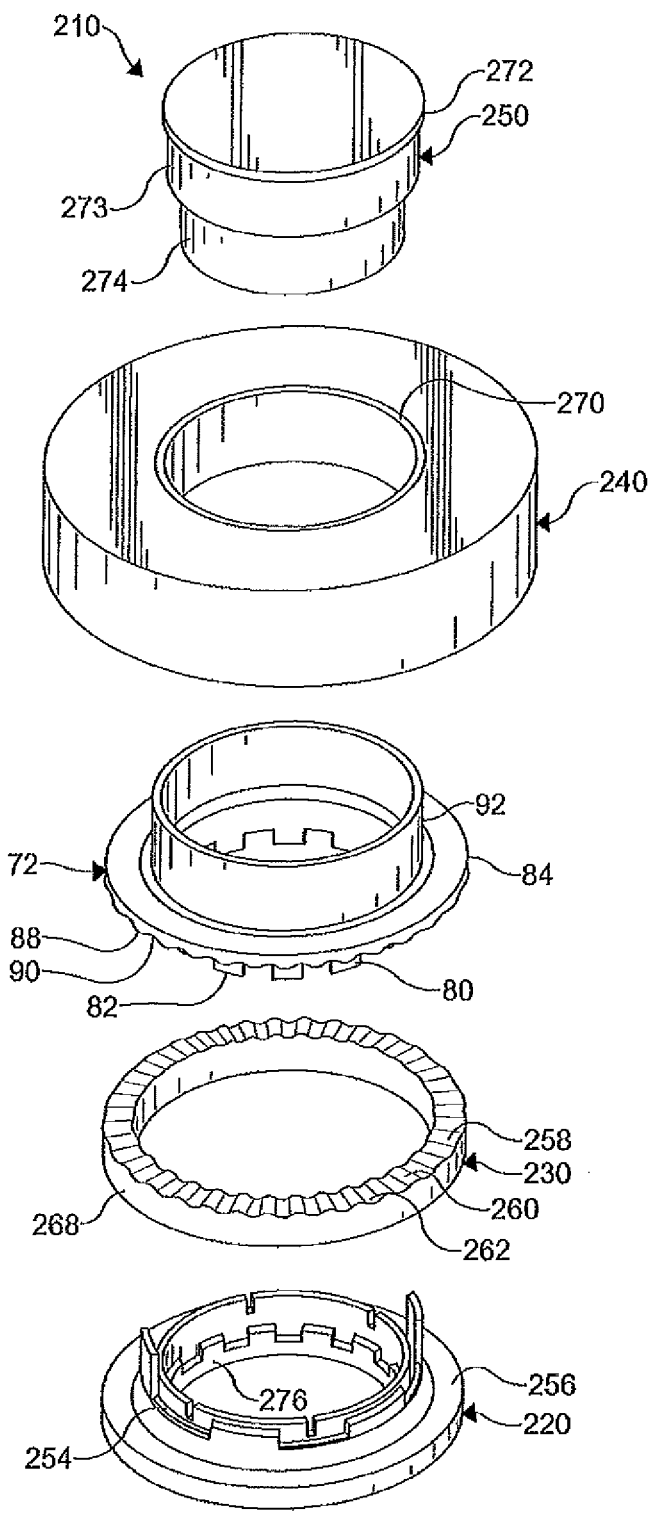
FIG. 4 is an exploded front perspective view of a mold assembly for forming a retainer of at least one of the rotary knob assemblies illustrated in FIGS. 1-3, showing the retainer therein.
Figure 5:
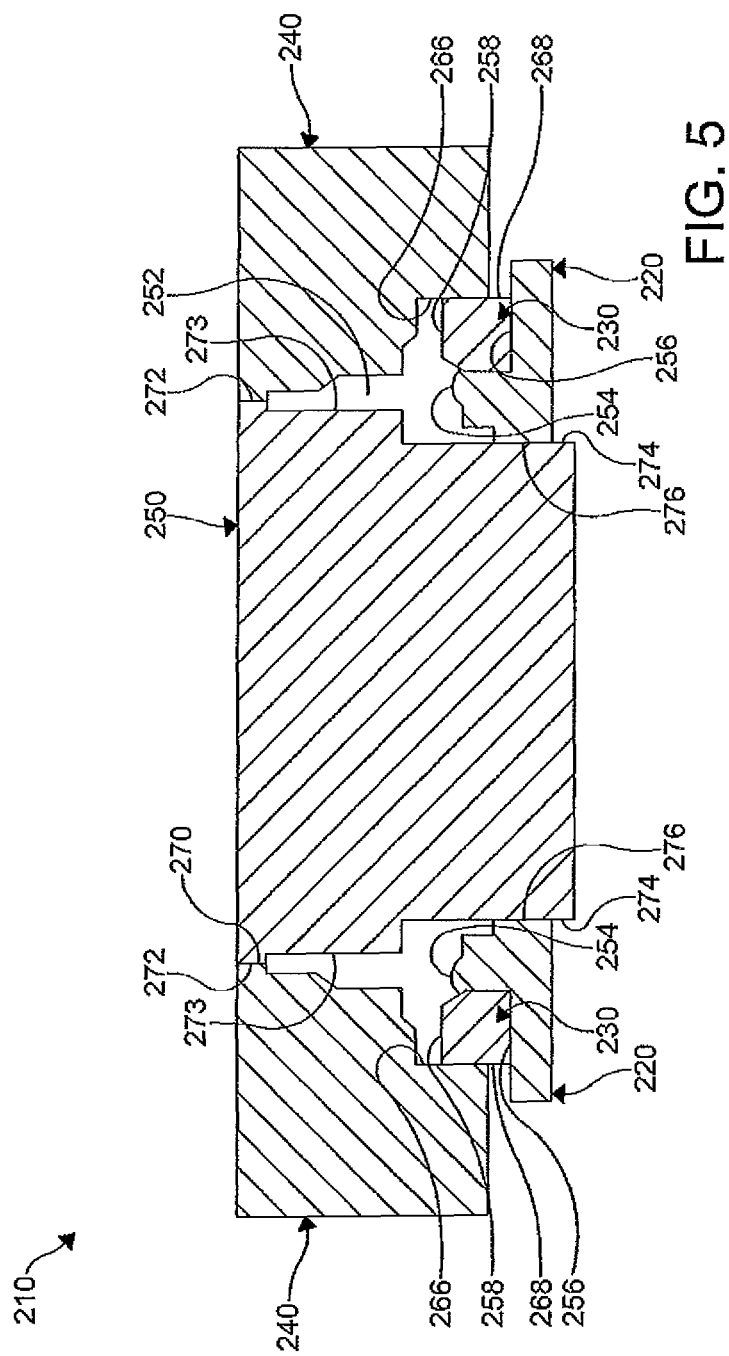
FIG. 5 is a cross-sectional view of the assembled mold assembly illustrated in FIG. 4.

Referring now to FIGS. 4-5, a mold assembly 210 for forming the retainer 72 for the knob assembly 10 is shown. It is understood that the mold assembly 210 can also be used for forming the retainer 172 if desired. The mold assembly 210 may be used in any known forming process as desired such as an injection molding process, a casting process, and the like, for example. The mold assembly 210 includes an outer cavity insert 220, a haptic feedback insert 230, an outer core insert 240, and an inner core insert 250. The inserts 220, 230, 240, 250 shown are modifiable and replaceable. It is further understood that the mold assembly 210 can include other components necessary for the molding of the retainer 72 as desired. The inserts 220, 230, 240, 250 cooperate to form a mold cavity 252 shown in FIG. 5. The mold cavity 252 has a shape substantially similar to a shape of the retainer 72. It is understood that the mold cavity 252 is in fluid communication with a source of molten material. The molten material is introduced into the mold cavity 252 through a series of gates (not shown) and a sprue (not shown) to form the retainer 72.

The outer cavity insert 220 includes an annular array of protuberances 254 which form the grooved landings 86 in the retainer 72. Since the grooved landings 86, which cooperate with the raised portion 60 of the guide member 50 to maintain the radial position of the knob 70, require tight tolerances, the protuberances 254 require tight tolerances. Accordingly, the outer cavity insert 220 provides easy access for a tuning and a polishing of the protuberances 254 to ensure the desired radial position of the knob 70 is obtained. A shoulder portion 256 of the outer cavity insert 220 receives the haptic feedback insert 230 thereon.

The haptic feedback insert 230 includes a patterned surface 258 which corresponds to the patterned surface of the skirt 84 of the retainer 72. As shown in FIG. 4, the patterned surface 258 includes a plurality of peaks 260 and troughs 262. The peaks 260 and the troughs 262 correspond to the troughs 90 and the peaks 88, respectively, of the retainer 72. The haptic feedback insert 230 provides easy access for a tuning of the patterned surface 258 or a replacement thereof when a change in the patterned surface of the retainer 72 is required. Accordingly, the mold assembly 10 can be used to produce various knob assemblies having a variety of haptic feedbacks.

The outer core insert 240 is generally ring shaped and includes a shoulder portion 266 formed therein. The shoulder portion 266 circumscribes at least a portion of the haptic feedback insert 230 abutting an outer surface 268 thereof to militate against a formation of flash on the skirt 84 of the retainer 72 during the forming thereof. An inner surface 270 of the outer core insert 240 abuts a first outer surface 272 of the inner core insert 250. The inner core insert 250 includes a second outer surface 273 which forms the inner surface of the second end 92 of the retainer 72. Since the inner surface of the second end 92 of the retainer 72, which slidingly contacts the tabs 94 formed on the stabilizer 74 to maintain the radial position of the knob 70 requires tight tolerances, the second outer surface 273 of the inner core insert 250 requires tight tolerances. Accordingly, the inner core insert 250 provides easy access for a tuning of the second outer surface 273 to ensure the desired radial position of the knob 70 is obtained. A third outer surface of 274 of the inner core insert 250 abuts an inner surface 276 of the outer cavity insert 220.

In operation, the inserts 220, 230, 240, 250 cooperate to form the mold cavity 252. The molten material is then introduced into the mold cavity 252. Once the molten material is cooled to form the retainer 72, the inserts 220, 230, 240, 250 are separated. Thereafter, the finished retainer 72 is removed and disposed in the knob assembly 10. When a tuning of the knob assembly 10 is required, at least one of the inserts 220, 230, 240, 250 is selected to be modified and/or replaced. The inserts 220, 230, 240, 250 are modified to control friction surfaces of the retainer 72 and then replaced or replaced by another of the same inserts 220, 230, 240, 250 to control friction surfaces of the retainer 72.

Figure 6:
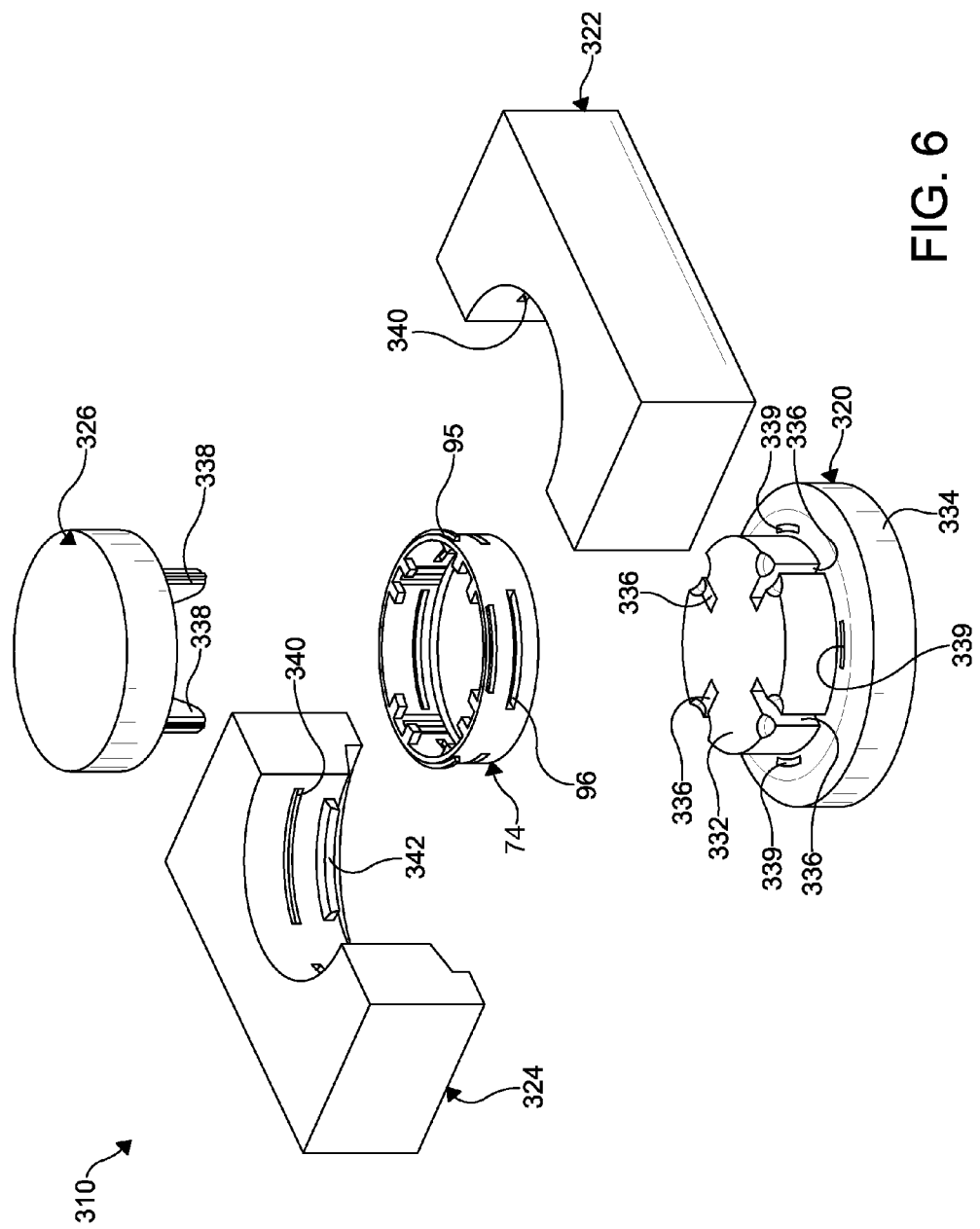
FIG. 6 is an exploded front perspective view of a mold assembly for forming a stabilizer of the rotary knob assembly illustrated in FIGS. 1-2, showing the stabilizer therein.
Figure 7:
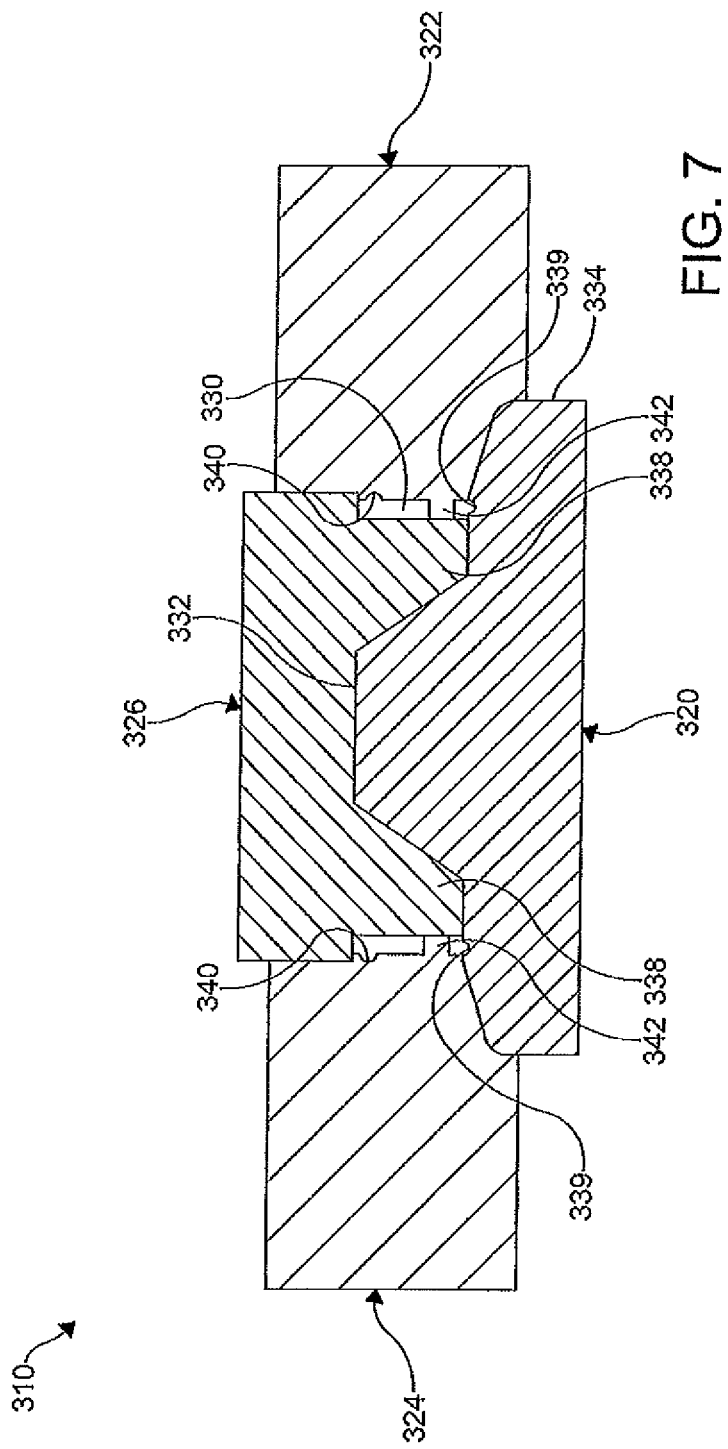
FIG. 7 is a cross-sectional view of the mold assembly illustrated in FIG. 6.

Referring now to FIGS. 6-7, a mold assembly 310 for forming the stabilizer 74 for the knob assembly 10 is shown. The mold assembly 310 may be used in any known forming process as desired such as an injection molding process, a casting process, and the like, for example. The mold assembly 310 includes an inner core insert 320, a pair of outer core inserts 322, 324, and an inner cavity insert 326. It is understood that the mold assembly 310 can include other components necessary for the molding of the stabilizer 74 as desired. The inserts 320, 322, 324, 326 cooperate to form a mold cavity 330 shown in FIG. 7. The mold cavity 330 has a shape substantially similar to a shape of the stabilizer 74. It is understood that the mold cavity 330 is in fluid communication with a source of molten material. The molten material is introduced into the mold cavity 330 through a series of gates (not shown) and a sprue (not shown) to form the stabilizer 74.

The inner core insert 320 is substantially disc shaped and includes an upper portion 332 and a lower portion 334. The upper portion 332 includes an array of slots 336 formed therein. The upper portion 332 abuts the inner cavity insert 326 so that leg members 338 formed on the inner cavity insert 326 are received in the slots 336 thereof. The upper portion 332 of the inner core insert 320 and the inner cavity insert 326 cooperate to form a fluid tight seal therebetween. The lower portion 334 includes an array of indentations 339 formed therein. The indentations 339 form the protuberances on the lower surface of the stabilizer 74. As shown in FIG. 7, the inner core insert 320 and the inner cavity inset 326 are circumscribed by the outer core position inserts 322, 324. Each of the outer core position inserts 322, 324 includes at least one groove 340 formed therein. The grooves 340 form the tabs 95 on the outer surface of the stabilizer 74. Since the tabs 95 of the stabilizer 74, which cooperate with the inner surface of the retainer 72 to maintain the radial position of the knob 70 require tight tolerances, the grooves 340 require tight tolerances. Accordingly, the outer core position inserts 322, 324 provide easy access for a tuning of the grooves 340 to ensure the desired radial position of the knob 70 is obtained. Each of the outer core position inserts 322, 324 further includes at least one protuberance 342. The protuberances 342 form the openings 96 in the stabilizer 74. Since the openings 96, which control the axial load on the retainer 72 and determine a torque required to rotate the knob 70 require tight tolerances, the protuberances 342 also require tight tolerances. Accordingly, the outer core position inserts 322, 324 provide easy access for a tuning of the protuberances 342 to ensure the desired radial position of the knob 70 is obtained. The inserts 320, 322, 324, 326 provide easy access for controlling a concentricity of the stabilizer 74.

In operation, the inserts 320, 322, 324, 326 cooperate to form the mold cavity 330. The molten material is then introduced into the mold cavity 330. Once the molten material is cooled to form the stabilizer 74, the inserts 320, 322, 324, 326 are separated. Thereafter, the finished stabilizer 74 is removed and disposed in the knob assembly 10. When a tuning of the knob assembly 10 is required, at least one of the inserts 320, 322, 324, 326 is selected to be modified and/or replaced. The inserts 320, 322, 324, 326 are modified to control friction surfaces of the stabilizer 74 and then replaced or replaced by another of the same inserts 320, 322, 324, 326 to control friction surfaces of the stabilizer 74.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A method for forming a knob assembly comprising the steps of:
    (a) providing a first cavity insert for a mold assembly;
    (b) providing a first inner core insert for the mold assembly;
    (c) providing a first pair of outer core inserts for the mold assembly;
    (d) positioning the first cavity insert, the first inner core insert, and the first pair of outer core inserts to form a first mold cavity within the mold assembly for receiving a molten material therein; and
    (e) introducing the molten material into the first mold cavity to form a stabilizer of the knob assembly, wherein the first cavity insert, the first inner core insert, and the first pair of outer core inserts are at least one of modifiable and replaceable, and wherein the first cavity insert, the first inner core insert, and the first pair of outer core inserts include a groove and a protuberance configured to form friction affecting features of the knob assembly.

2. The method according to claim 1, wherein the friction affecting features are at least one of a plurality of tabs formed on an outer surface of the stabilizer and a plurality of openings formed in the stabilizer.

3. The method according to claim 1, further comprising the steps of:
    (a) providing a second cavity insert for the mold assembly;
    (b) providing a second inner core insert for the mold assembly;
    (c) providing a second outer core insert for the mold assembly;
    (d) providing a haptic feedback insert for the mold assembly;
    (e) positioning the second cavity insert, the second inner core insert, the second outer core insert, and the haptic feedback insert to form a second mold cavity within the mold assembly for receiving the molten material therein; and
    (f) introducing the molten material into the second mold cavity to form a retainer of the knob assembly, wherein at least one of the second cavity insert, the second inner core insert, the second outer core insert, and the haptic feedback insert form friction affecting features of the knob assembly.

4. The method according to claim 3, wherein the friction affecting features are at least one of a plurality of grooved landings formed in the retainer and an inner surface of an end of the retainer.

5. The method according to claim 3, wherein the retainer includes at least one grooved landing formed therein.

6. The method according to claim 3, wherein the stabilizer includes at least one opening formed therein to control an axial load on the retainer which determines a torque required to rotate a knob of the knob assembly.

7. The method according to claim 3, further comprising the step of providing a guide member disposed between a mounting structure of the knob assembly and a knob of the knob assembly.

8. The method according to claim 7, wherein the retainer includes a patterned surface.

9. The method according to claim 8, wherein a detent is formed on the guide member which cooperates with the patterned surface of the retainer to produce a desired haptic feedback.

10. The method according to claim 7, wherein a raised portion of the guide member cooperates with the retainer to maintain a radial position of the knob.

11. The method according to claim 1, wherein the first pair of outer core inserts include each of the groove and the protuberance, and wherein at least a portion of the groove is axially spaced from and radially aligned with at least a portion of the protuberance.

12. The method according to claim 3, wherein the stabilizer is configured to include an inner track, and further comprising the step of providing an outer track and a plurality of ball bearings on the stabilizer.

13. The method according to claim 12, wherein the retainer forms the outer track of the stabilizer.

14. A method for forming a knob assembly comprising the steps of:
    (a) providing a first mold assembly comprising a first cavity insert, a first inner core insert, and a first pair of outer core inserts positioned to form a first mold cavity within the first mold assembly, each of the first pair of outer core inserts including a groove and a protuberance formed thereon;
    (b) introducing a molten material into the first mold cavity to form a stabilizer of the knob assembly, wherein the groove and the protuberance form friction affecting features of the stabilizer;
    (c) providing a second mold assembly comprising a second inner core insert, a second outer core insert, a haptic feedback insert, and a second outer cavity insert positioned to form a second mold cavity within the second mold assembly;

(d) and introducing the molten material into the second mold cavity to form a retainer of the knob assembly;

(e) providing a guide member having at least one detent formed thereon; and (f) assembling each of the guide member, the stabilizer, and the retainer to a mounting structure, wherein the retainer is rotatably disposed intermediate the guide member and the stabilizer.

15. The method according to claim 14, wherein a first one of the friction affecting features is a tab, and the tab abuts an inner surface of the retainer, and a second one of the friction affecting features is an opening, and permits a flexing of the stabilizer.

16. The method according to claim 15, wherein the opening is a rectangular shaped opening formed in the stabilizer.

17. The method according to claim 15, wherein at least a portion of the groove is axially spaced from and radially aligned with at least a portion of the protuberance.

* * * * *